April 15, 1952   F. A. COMPTON, JR   2,593,105
ROTOR FOR DYNAMOELECTRIC MACHINES
Filed Feb. 15, 1951

Inventor:
Frank A. Compton Jr.
by Ernest C. Britton
His Attorney.

Patented Apr. 15, 1952

2,593,105

UNITED STATES PATENT OFFICE 2,593,105

ROTOR FOR DYNAMOELECTRIC MACHINES

Frank A. Compton, Jr., Erie, Pa., assignor to General Electric Company, a corporation of New York Application February 15, 1951, Serial No. 211,121

10 Claims. (Cl. 171—206)

This invention relates to rotors for dynamoelectric machines and more particularly means for banding the end turns thereof.

In the design of rotors for dynamoelectric machines, particularly armatures for direct current traction motors, it is necessary to provide banding of the end turns in order to resist the action of centrifugal force. In the past, this banding has been accomplished by winding several layers of binding wire on the end turns, each layer having approximately the same number of turns. It is desirable, however, to provide an arrangement in which the restraining ability of the binding wire is proportional to the force exerted thereon by the end turns, this force being in turn proportional to the distance from the core.

An object of this invention is to provide improved banding for the end turns of dynamoelectric machine rotors.

This invention in its broadest aspects contemplates a rotor for a dynamoelectric machine having a core member with slots formed in its outer surface and windings arranged therein having their end turns projecting therefrom. Binding means are provided circumferentially engaging the end turns for resisting the action of centrifugal force thereon, the binding means being radially thicker adjacent the outer ends of the end turns than adjacent the core so that the resistance provided by the binding means is proportional to the force exerted thereon by the end turns.

Figure 1:
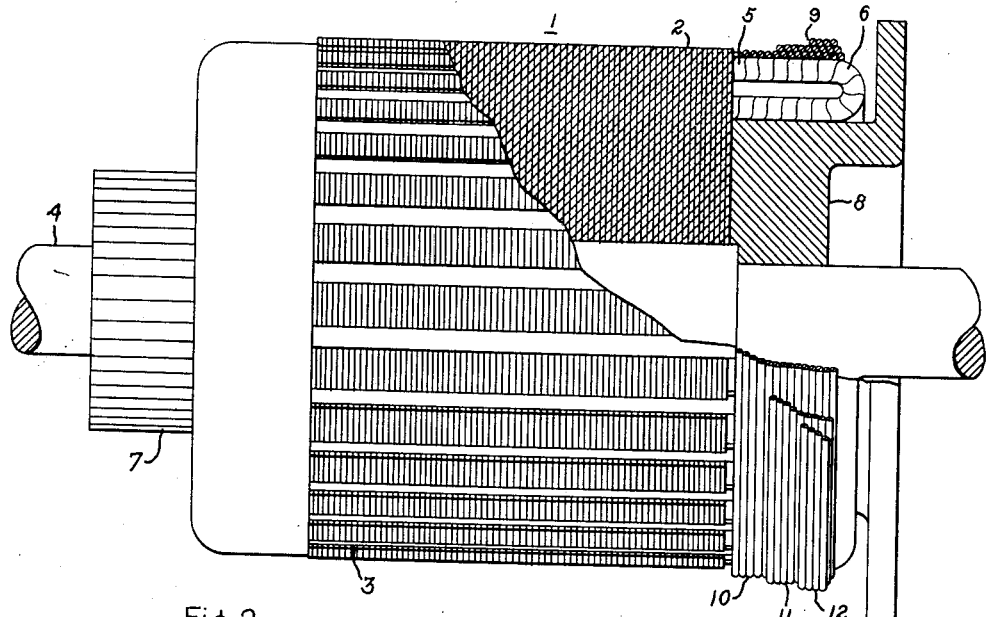
Figure 2:
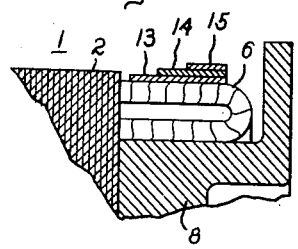
Figure 3:
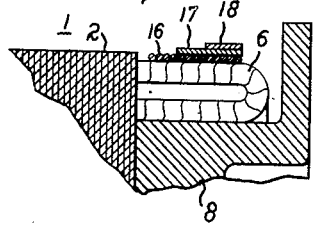
Figure 4:
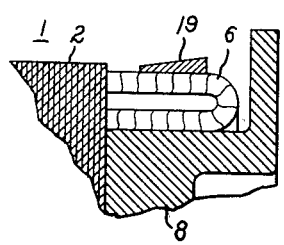
Figure 5:
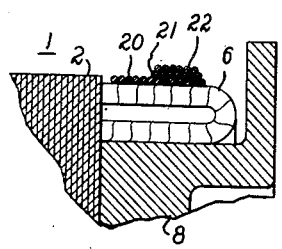

In the drawing Fig. 1 is a side elevational view, partly in section, showing the improved armature banding of this invention; Fig. 2 is a fragmentary cross-sectional view illustrating a modified form of banding; Fig. 3 is another fragmentary cross sectional view illustrating another modification; and Figs. 4 and 5 are additional fragmentary cross sectional views illustrating further modifications.

Referring now to Fig. 1, there is shown an armature 1, for instance, for a direct current traction motor, having a core portion 2 with a plurality of axially extending winding slots 3 formed therein. The core 2 is mounted on shaft 4 and suitable windings 5 are arranged in the slots 3 with end turns 6 projecting beyond the core 2. The windings 5 are connected to commutator 7 in any suitable manner (not shown). An end turn supporting member 8 is provided secured to the shaft 4 for supporting the end turns 6.

In order to resist the action of centrifugal force on the coils, the portions in the slots 3 are restrained by wedges (not shown) in the conventional manner and binding wire 9 is wound on the end turns in three layers 10, 11 and 12, the inner layer 10 extending substantially from a point immediately adjacent the core 2 to a point adjacent the ends of the end turns 6. The outer layers 11 and 12 have successively less turns than the inner layer 10 and respectively start at points further removed from the core 2 and extend to substantially the same point as the inner layer 10. It will now be readily seen that the resultant banding arrangement provides a substantially triangular shaped cross section with the thickest portion adjacent the ends of the end turn 6 and the narrowest portion adjacent the core 2. Since the wedges restrain the coils at the ends adjacent the core 2, the force exerted by the end turn 6 on the binding wire is proportional to the distance from the core 2, i. e., greatest at the ends of the end turn 6 and smallest immediately adjacent the core 2. The arrangement shown in Fig. 1 provides a restraining force exerted by the binding wire proportional to the force exerted by the end turn 6 thereon, the largest amount of wire being found adjacent the outer ends of the end turns 6 and the smallest amount adjacent the core 2.

It will now be readily apparent that this arrangement provides the maximum amount of restraining force by using a minimum amount of binding wire since the restraint provided will be as effective as an arrangement having three layers of binding wire of substantially the same number of turns. A conventional direct current traction motor armature of approximately nineteen inches diameter was tested with the conventional banding arrangement having 44 turns of binding wire on the first layer and 43 turns on the second layer. At 2280 R. P. M. this banding arrangement expanded 13.8 mils on the radius. The same armature was then tested with a triangular band having 44 turns on the first layer, 28 on the second layer and 15 turns on the third layer, the total number of turns being the same as the conventional construction. With this arrangement at 2280 R. P. M., the expansion of the triangular banding was only 5.3 mils on the radius.

It will be readily apparent that the binding wire 9 of Fig. 1 could be replaced by solid bands of varying widths so as to give the greatest total thickness at the outer ends of the end turns. Referring now to Fig. 2 in which like elements are indicated by like reference numerals, there is shown a banding arrangement utilizing three solid bands 13, 14 and 15, the inner band 13 extending from a point immediately adjacent the core 2 to a point substantially at the end of the end turns 6. The outer bands 14 and 15 are successively narrower than the inner band 13 and successively further removed from the core 2 extending respectively to substantially the same point as the inner band 13. As in the case of the arrangement of Fig. 1, this provides a banding construction in which the greatest thickness is provided adjacent the outer ends of the end turns 6 and the minimum thickness adjacent the core 2. The solid bands 13, 14 and 15 can be readily applied to the end turns 6 by being initially heated and then shrunk on to the end turns 6.

It will also be readily apparent that a combination of binding wire and solid bands may be utilized as shown in Fig. 3. Here there is shown an arrangement in which the first layer 16 is formed of binding wire and the second and third layers 17 and 18 are solid bands.

It will also be readily apparent from Fig. 4 that the same objective can be achieved by using a one piece band 19 of triangular shape arranged so that the thickest part is farthest removed from the core 2.

For the sake of convenience in manufacturing, it may be desirable to use a continuous wire in winding the three layers. As shown in Fig. 5, starting at the end of the core the first layer 20 is wound; the second layer 21 is then started from the outer end and wound toward the core; and the third layer 22 is then continued from the same wire and wound away from the core. The result so obtained provides a third layer with approximately the same width as the second layer, both of which are of less width than the first layer.

It will now be readily understood that the improved banding of this invention provides the maximum restraining efforts with the minimum amount of material and in so doing keeps banding losses to a minimum.

While I have shown and described particular embodiments of this invention, further modifications and improvements will occur to those skilled in the art. I desire it to be understood, therefore, that this invention is not limited to the particular form shown, and I intend in the appended claims to cover all modifications which do not depart from the spirit and scope of this invention.

What I claim as new and desire to secure by Letters Patent of the United States is:

1. In a rotor for a dynamoelectric machine having a core member with slots formed in its outer surface and windings arranged in said slots having end turns projecting therefrom, binding means circumferentially engaging said end turns for resisting the action of centrifugal force thereon, said binding means being radially thicker adjacent the outer ends of said end turns than adjacent said core whereby the restraint provided by said binding means is proportional to the force exerted thereon by said end turns.

2. In a rotor for a dynamoelectric machine having a core member with slots formed in its outer surface and windings arranged in said slots having end turns projecting therefrom, binding means circumferentially engaging said end turns for resisting the action of centrifugal force thereon, said binding means being substantially triangular in cross section with the thickest portion thereof arranged adjacent the ends of said end turns whereby the restraint provided by said binding means is proportional to the force exerted thereon by said end turns.

3. In a rotor for a dynamoelectric machine having a core member with slots formed in its outer surface and windings arranged in said slots having end turns projecting therefrom, binding means circumferentially engaging said end turns for resisting the action of centrifugal force thereon, said means including a plurality of successively narrower layers, the widest of said layers being arranged on said end turns and the remaining layers being arranged thereover, each of said remaining layers starting at a point further removed from said core than the layer thereunder so that said binding means is radially thicker adjacent the outer ends of said end turns than adjacent said core whereby the restraint provided by said binding means is proportional to the force exerted thereon by said end turns.

4. In a rotor for a dynamoelectric machine having a core member with slots formed in its outer surface and windings arranged in said slots having end turns projecting therefrom, binding wire wound on said end turns for resisting the action of centrifugal force thereon, said wire being wound in a plurality of layers with each successive layer having less turns and starting at a point further removed from said core than the layer thereunder so that said binding wire is radially thicker adjacent the outer ends of said end turns than adjacent said core whereby the restraint provided by said binding wire is proportional to the force exerted thereon by said end turns.

5. In a rotor for a dynamoelectric machine having a core member with slots formed in its outer surface and windings arranged in said slots having end turns projecting therefrom, binding wire wound on said end turns for resisting the action of centrifugal force thereon, said wire being wound in a plurality of layers with each successive layer having less turns than the one thereunder, the first of said layers starting adjacent said core and extending substantially the entire length of said end turns, each successive layer starting at a point further removed from said core and extending to substantially the same point as said first layer so that said binding wire is radially thicker adjacent the outer ends of said end turns than adjacent said core whereby the restraint provided by said binding wire is proportional to the force exerted thereon by said end turns.

6. In a rotor for a dynamoelectric machine having a core member with slots formed in its outer surface and windings arranged in said slots having end turns projecting therefrom, a plurality of said bands arranged on said end turns for resisting the action of centrifugal force thereon, said bands being arranged in layers with each successive band being narrower than the one thereunder, the first of said bands being arranged adjacent said core and extending substantially the entire length of said end turns, each successive band being arranged further from said core and extending to substantially the same point as said first band so that said bands are radially thicker adjacent the outer ends of said end turns than adjacent said core whereby the restraint provided by said bands is proportional to the force exerted thereon by said end turns.

7. In a rotor for a dynamoelectric machine having a core member with slots formed in its outer surface and windings arranged in said slots having end turns projecting therefrom, binding means circumferentially engaging said end turns for resisting the action of centrifugal force therein, said binding means including a plurality of successively narrower annular bands, the first of said bands being arranged adjacent said core and extending substantially the entire length of said end turns, each successive band being arranged further from said core and extending to substantially the same point as said first band so that said binding means is radially thicker adjacent the outer ends of said end turns than adjacent said core whereby the restraint provided by said binding means is proportional to the force exerted thereon by said end turns.

8. In a rotor for a dynamoelectric machine having a core member with slots formed in its outer surface and windings arranged in said slots having end turns projecting therefrom, binding means circumferentially engaging said end turns for resisting the action of centrifugal force thereon, said means including a plurality of successively narrow layers, at least one of said layers being formed of binding wire and at least one being an annular solid band, the widest of said layers being arranged on said end turns and the remaining layers being arranged thereover, each of said remaining layers starting at a point further removed from said core than the layer thereunder so that said binding means is radially thicker adjacent the outer ends of said end turns than adjacent said core whereby the restraint provided by said binding means is proportional to the force exerted thereon by said end turns.

9. In a rotor for a dynamoelectric machine having a core member with slots formed in its outer surface and windings arranged in said slots having end turns projecting therefrom, a solid band arranged on said end turns for resisting the action of centrifugal force thereon, said solid band being substantially triangular in cross section with the thickest portion thereof arranged adjacent the ends of said end turns whereby the restraint provided by said band is proportional to the force exerted thereon by said end turns.

10. In a rotor for a dynamoelectric machine having a core member with slots formed in its outer surface and windings arranged in said slots having end turns projecting therefrom, binding wire wound on said end turns for resisting the action of centrifugal force thereon, said wire being continuously wound in a plurality of layers with the first of said layers starting adjacent said core and extending substantially the entire length of said end turns, the second layer starting adjacent said end turns and extending toward said core with the end of said second layer being further removed from said core and the starting point of said first layer so that said binding wire is radially thicker adjacent the outer ends of said end turns than adjacent said core whereby the restraint provided by said binding wire is proportional to the force exerted thereon by said end turns.

FRANK A. COMPTON, JR.

REFERENCES CITED

The following references are of record in the file of this patent:

UNITED STATES PATENTS

| Number | Name | Date |
|---|---|---|
| 2,519,219 | Baudry et al. | Aug. 15, 1950 |